US009939625B2

United States Patent
Herrmann et al.

(10) Patent No.: US 9,939,625 B2
(45) Date of Patent: Apr. 10, 2018

(54) DEVICE AND METHOD FOR FORMING AN IMMERSION AGENT FILM

(71) Applicant: Carl Zeiss Microscopy GmbH, Jena (DE)

(72) Inventors: Hendrik Herrmann, Bernried (DE); Reinold Wischnewski, Utting (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/001,967

(22) Filed: Jan. 20, 2016

(65) Prior Publication Data

US 2016/0334611 A1    Nov. 17, 2016

(30) Foreign Application Priority Data

Jan. 21, 2015  (DE) .................. 10 2015 200 927

(51) Int. Cl.
*G02B 21/33*    (2006.01)
*B05B 9/01*    (2006.01)
(Continued)

(52) U.S. Cl.
CPC .............. *G02B 21/33* (2013.01); *B05B 9/01* (2013.01); *B05B 13/0278* (2013.01); *G02B 21/248* (2013.01); *G02B 21/26* (2013.01)

(58) Field of Classification Search
CPC ... G02B 21/00; G02B 21/002–21/0036; G02B 21/004; G02B 21/02; G02B 21/24;
(Continued)

(56) References Cited

U.S. PATENT DOCUMENTS 4,472,204 A    9/1984  Fischbach
6,980,293 B1   12/2005 Harada
(Continued)

FOREIGN PATENT DOCUMENTS

DE    3122408 A1    12/1982
DE    10123027 A1   11/2002
(Continued)

OTHER PUBLICATIONS

TPS. easyFLOW-VS Variable Speed Peristaltic Dosing Pump, TPS Pty Ltd, www.tps.com/au, Feb. 24, 2006.*
(Continued)

*Primary Examiner* — Stephone B Allen
*Assistant Examiner* — Adam W Booher
(74) *Attorney, Agent, or Firm* — Patterson Thuente Pedersen, P.A.

(57) ABSTRACT

A method for forming an immersion agent film between the sample holder and the objective of a microscope, comprising an automatic immersion module for supplying immersion agent from an immersion agent reservoir to a target position on the sample holder or on the positioning stage, the automatic immersion module having a spraying device with a nozzle connected to a pump for the purpose of generating an immersion agent jet. A dosed immersion agent jet is sprayed via the automatic immersion module onto a target position on the sample holder or a position on the positioning stage, at a defined speed.

18 Claims, 4 Drawing Sheets

(51) Int. Cl.
  *B05B 13/02*  (2006.01)
  *G02B 21/24*  (2006.01)
  *G02B 21/26*  (2006.01)

(58) Field of Classification Search
  CPC .................. G02B 21/248; G02B 21/26; G02B 21/33–21/34; B05B 9/01; B05B 9/03; B05B 9/04; B05B 9/0403; B05B 9/0426; B05B 13/02; B05B 13/0278; G03F 7/70341
  USPC .................................................. 359/362–398
  See application file for complete search history.

(56) References Cited

U.S. PATENT DOCUMENTS

| | | | |
|---|---|---|---|
| 7,304,793 | B2 | 12/2007 | Hummel |
| 7,619,829 | B2* | 11/2009 | Okazaki ............. G02B 21/0088 359/368 |
| 8,199,407 | B2 | 6/2012 | Liebel et al. |
| 2005/0094258 | A1 | 5/2005 | Tanabe et al. |
| 2006/0021569 | A1* | 2/2006 | Petrillo .................. G02B 21/33 118/300 |
| 2006/0238885 | A1 | 10/2006 | Hasegawa et al. |
| 2006/0274424 | A1 | 12/2006 | Okazaki et al. |
| 2006/0291041 | A1* | 12/2006 | Berns ..................... G02B 21/33 359/368 |
| 2008/0170292 | A1 | 7/2008 | Harada et al. |

FOREIGN PATENT DOCUMENTS

| | | |
|---|---|---|
| EP | 1679540 A1 | 7/2006 |
| JP | H04-340242 A | 11/1992 |
| JP | 2005062687 A | 3/2005 |
| WO | WO 2008/028475 A2 | 3/2008 |

OTHER PUBLICATIONS

Zeiss, ZEN 2011 (blue edition) Service Pack 1, Carl Zeiss Microscopy GmbH, Jun. 2012.*

German Search Report issued from German Patent and Trademark Office for Application No. 10 2015 200 927.0, printed Jun. 19, 2015, including English translation (18 pages total).

* cited by examiner

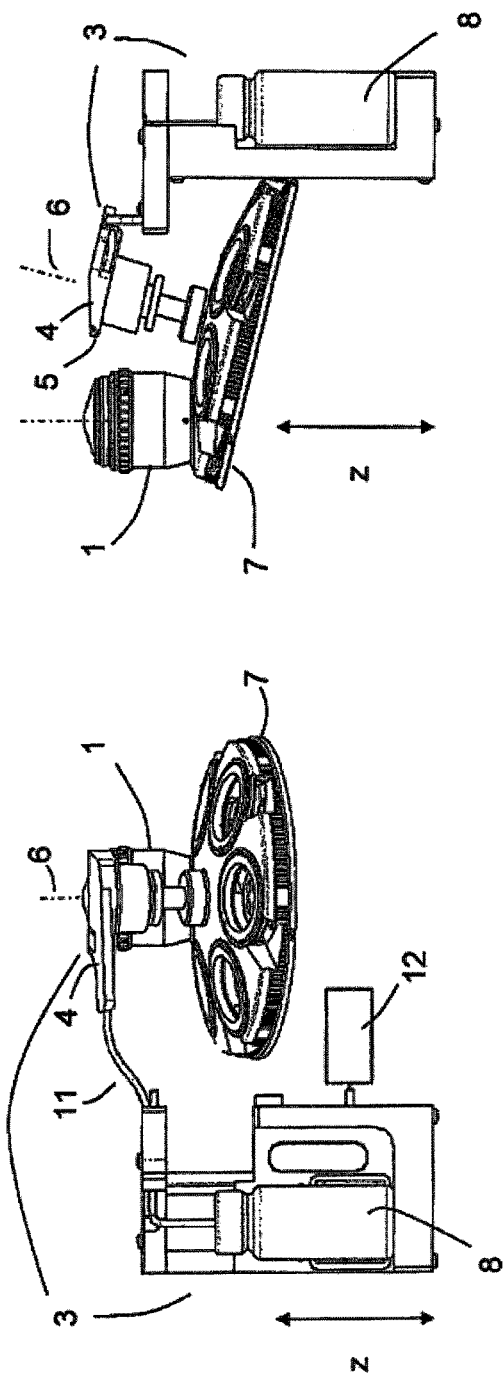
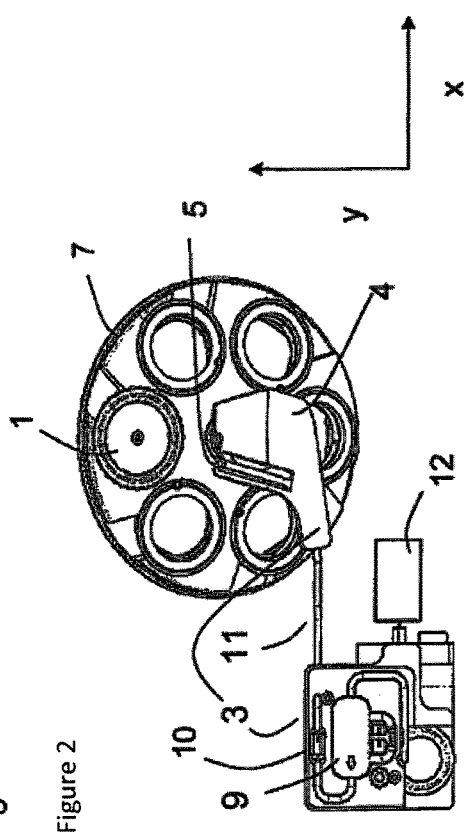
Figure 3
Figure 2
Figure 4

DEVICE AND METHOD FOR FORMING AN IMMERSION AGENT FILM

RELATED APPLICATIONS

The present application claims priority to German Application No. 102015200927.0, filed Jan. 21, 2015, said application being incorporated herein in its entirety by reference.

TECHNICAL FIELD

The invention relates to a device and a method for forming an immersion agent film between the sample holder and the objective of a microscope.

BACKGROUND

Known solutions for forming an immersion agent film are mostly based on the approach of providing the objective with a sealing collar which is filled with immersion agent by means of a permanent feed, and optionally is also emptied by means of the same. The design of the collar enables, on the one hand, the formation of the immersion, and on the other hand prevents the immersion agent from flowing off into the device. Such solutions are described, by way of example, in WO 2008/028475 A2/A3, US 2010/0027109 A1, DE 101 23 027 B4, and DE102005040828.

In one variant according to DE 101 23 027 B4, the medium is introduced by means of a cannula directly adjacent to the front lens of the microscope.

SUMMARY

US 2006238885A and US 2005022731 describe variants in which, when the objective is advanced downward, a cannula is pivoted over the front lens. In this case, it is disadvantageous that it is not possible to work continuously. In addition, there is an increased risk of collision in this case.

Furthermore, the known solutions have the disadvantage that, when the size of the objective is increased, it is no longer possible to position the same over the entire sample because the objectives can collide with the edge of the sample holder. In this case, mechanical damage to the delicate structures can easily occur.

Typically, in constructions with collars, the diameter of the immersion drops is also greater, which can likewise lead to a reduced area of travel because the drops tend to form capillary edges between the objective and the sample holder frame.

In addition, a complete immersion module must be available for each objective. Because the construction of the objectives must be modified, the handling thereof (installation, removal, adjustment), among other things, is made more difficult.

In addition to the collar construction surrounding the objective, in which the immersion agent is "submerged", and to the solutions in which the immersion agent is introduced directly via a cannula, alternatives are also known in which either the complete sample is submerged, or the objective itself is dipped into a reservoir with immersion agent.

DE 3122408C2 describes a method wherein a perpendicular jet serves the purpose of cleaning an ultrasound objective and applying an immersion drop. The cleaning apparatus in this case must be pivoted underneath the objective, and as a result it is not possible to work continuously.

Proceeding from the disadvantages of the solutions of the prior art, the problem addressed by the invention is that of further advancing a method and a device for forming an immersion agent film between the sample holder and the objective of a microscope in a manner which allows improved handing and continuous working with different objectives, without a mechanical modification of the objective used.

This problem is addressed by means of a device according to the invention of the type named above, having the features of claim 1. Advantageous embodiments are given in dependent claims 2 to 9. In addition, the problem is addressed according to the invention by a method of the type described above, having the method steps given in claim 10. Advantageous method steps are given in the dependent claims 11 to 18.

The device according to the invention comprises an automatic immersion module for the purpose of supplying the immersion agent from an immersion agent reservoir to a target point on the sample holder or on a positioning stage, consisting of a spraying device configured with a nozzle and connected to a pump for the purpose of generating an immersion agent jet.

In one advantageous embodiment variant, the spraying device is arranged directly in the axis of an objective revolver such that it is protected and the handling of the microscope is not influenced.

In a further advantageous embodiment, the spraying device is fixed outside of the objective revolver on the microscope stand. In this variant, however, the space between the objective and the sample holder must be accessible for the free immersion agent jet.

In a further advantageous embodiment, for the purpose of preventing bubbles at the target point, the spraying device is oriented in such a manner that the immersion agent jet slightly bypasses the beam path of the objective.

To vary the target point, the sample holder is arranged to be able to move axially perpendicular to the optical axis in the x/y-direction, and the objective revolver to move axially in the z-direction.

As a result of the movement options, an immersion agent drop can be formed on the sample holder or the positioning stage by spraying at any point, and can be transported to the objective by subsequently changing the position of the stage and the objective revolver. For this to occur, it must be possible to form the immersion agent jet continuously. In addition, the target point must first of all be suitable for receiving an immersion agent drop, and secondly must be able to move over the objective when the stage is moved. Once the immersion has been produced, the positioning can be performed in the sample area being investigated. The immersion agent drop remains in the immersion gap in this case. However, this variant has the disadvantage that it is not possible to work continuously.

The pump and the nozzle can advantageously be adjusted for the purpose of varying the immersion agent jet, for both the dosing and speed of the immersion agent jet. The adjustment is performed such that the required flow is formed and the drops of the immersion agent jet leave the nozzle with the least possible speed. On the other hand, a minimum speed must be achieved to ensure that no undesired collision with the objective occurs as the result of the immersion agent jet being too strongly curved.

In a further advantageous embodiment, an actuating element which sprays a defined volume of immersion agent is used to manually initiate the immersion agent jet.

This function can also be implemented as a soft button on the surface of a touch display used to control the microscope functions, or as a corresponding element in the operating software of a connected computer.

For automatically initiating the immersion agent jet, the automatic immersion module is connected to a control device which can be designed, for example, as a microcontroller.

In conjunction with the design of the device, using the method according to the invention a dosed immersion agent jet is sprayed onto a target position on the sample holder, or a position on the positioning stage, with a defined speed, without a mechanical modification being made on the objective. In this way, the handling—such as the installation and removal of objectives, and the functionality of the stand during continuous work with different objectives—is also improved in comparison to the prior art.

The constructed space immediately around the objective is not touched.

As a result, the stage positioning area, and therefore the observable sample surface, is not restricted in any way.

As a further result, collisions cannot occur which could lead to damage to the generally delicate structures of the specific immersion apparatus in use. The method is accordingly robust.

The construction enables continuous work with different objectives of an objective revolver set. It is easy and quick to retrofit existing systems.

The immersing advantageously occurs in the focal position of the objective.

For objectives with a minimal working distance, the immersion agent jet is sprayed onto the objective and the sample holder in front of the optical axis, and then covers the immersion gap via capillary action.

For objectives with a structural shape which does not allow direct spraying into the immersion area, an objective with a lower height, or an empty position of the objective revolver, is first pivoted into the optical axis, and then a small dose of the immersion agent is applied to the cover glass. Then, once the objective being used is repositioned in the focal position, the immersion is automatically created.

The potential creation of air bubbles in the immersion agent, as a result of the spraying process, constitutes a problem depending on the method, and this can be minimized by various measures:

optimizing the pump parameters: pressure, spray duration, and/or spray volume, as well as repeat frequency, pretreating the medium:
  If water is used, a defoaming agent such as isoamyl alcohol can prevent the occurrence of bubbles in the interior of the immersion column.
  Also for cases where water is used, decarbonization is practical.
  Degassing using a vacuum is also advantageous.
Spraying the immersion agent into the gap formed by the objective cone and the sample holder in front of the optical axis causes fewer bubbles than directly spraying onto the sample holder. If bubbles are created, then this occurs primarily toward the end of the spraying process and therefore far away from the optical axis. If the medium is then taken into the space between the objective lens and the sample holder by capillary action, a substantially bubble-free immersion is formed.

For the purpose of removing bubbles in the immersion agent, the distance between the objective and the sample holder can be enlarged, wherein the immersion column is stretched and constricted. Bubbles present freely in the medium are pushed by this action to the edge of the column, and burst when they pass through the boundary surface. The immersion column tearing in the process is not a problem. When the objective is repositioned in the focal position, the immersion is automatically re-established from the residues adhering to the objective and to the sample holder.

Bubbles which adhere to the sample holder are stationary. They are only destroyed by leaving the immersion column. To achieve this, several methods can be contemplated:

When the stage is moved around the diameter of the immersion column base surface on the sample holder, all the bubbles are drawn out of the immersion column fixed between the sample holder and the objective.

The rotation of the objective revolver by approx. 10° leads to the same result. The immersion column migrates with the rotating objective and in the process strips off the bubbles on the sample holder. In addition, with the increasing distance between the sample and the objective, the base surface of the immersion column adhering to the sample holder is reduced.

A combination of the above methods is practical. After the immersion column is stretched, and the freely-moving bubbles connected are consequently removed, the path the bubbles adhering to the sample holder must travel to be removed is also shortened as the diameter of the immersion column base surface is reduced.

In principle, bubbles can also be removed by means of ultrasound.

In addition, a requirement for reliable operation is the tube system being free of air. For this reason, before the automatic immersion module is used, suitable pump procedures must be used to ensure that all air is driven out of the tube/pump system. For this purpose, optimized control procedures exist for the pump. If, in addition, the pump pressure is set low enough that no free jet is created, and rather the immersion agent drips out, the risk of contaminating the stand is minimized, as long as a capture device is installed.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

The device according to the invention is described in greater detail below with reference to an embodiment, wherein:

FIG. 2 shows a schematic illustration of the device with the arrangement of the spraying device on an objective revolver;

FIG. 3 shows a schematic illustration of the device according to FIG. 2 in another lateral illustration;

FIG. 4 shows a schematic illustration of the device according to FIGS. 2 and 3, in a top view;

Figure 1:
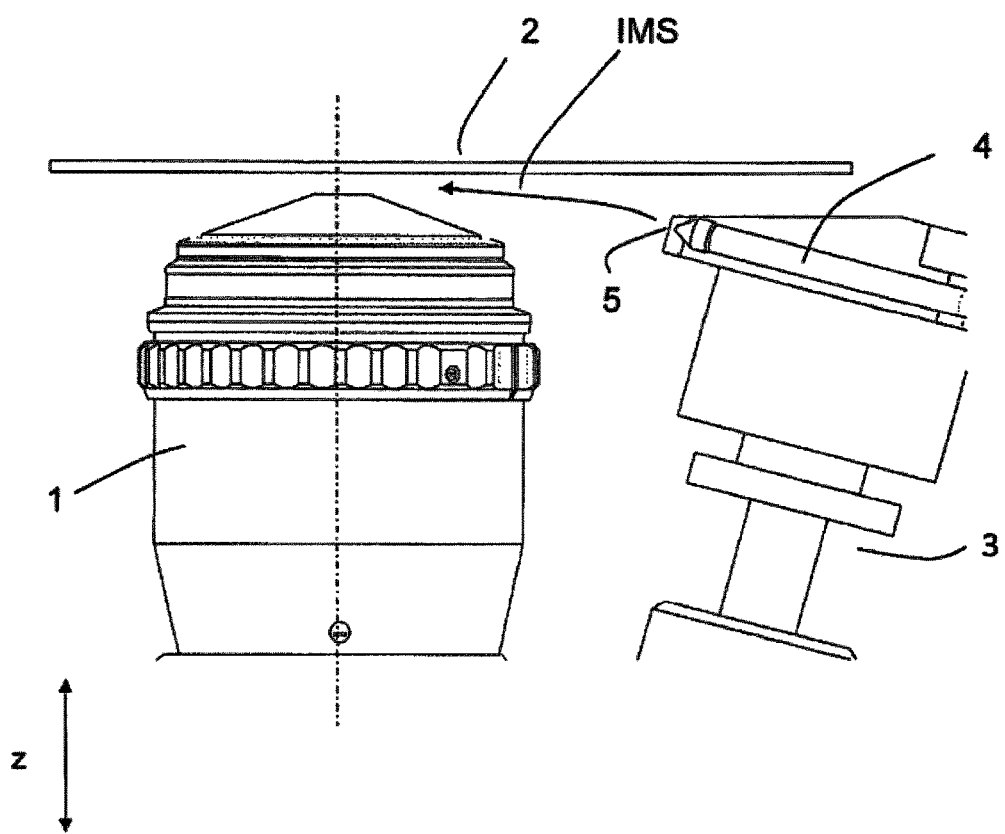
FIG. 1 shows a schematic illustration of the device.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 shows the device according to the invention, having an objective 1, a sample holder 2 designed as a cover glass, and an automatic immersion module 3 arranged to the side of the objective 1, with a spraying device 4 which is configured with a nozzle 5 for the purpose of supplying an immersion agent to a target position on the sample holder 2. The nozzle 5 in this case is arranged in such a manner that it is possible to operate with different objectives 1.

FIGS. 2, 3, and 4 illustrate the device with the arrangement of the spraying device 4 in the axis 6 of an objective revolver 7, in different views. In this embodiment, the spraying device 4 has a protected arrangement without compromising the handling of the microscope.

In addition, FIGS. 2, 3, and 4 show, along with the spraying device 4 with the nozzle 5, the automatic immersion module 3 with an immersion agent reservoir 8, a pump 9, a check valve 10, and a connecting tube 11 to the spraying device 4.

For the purpose of varying the target position, the sample holder 2 is arranged in a manner allowing axial movement perpendicular to the optical axis of the objective 1 in the x/y-direction, and the objective revolver 7 is arranged in a manner allowing axial movement in the z-direction.

To allow an automated initiation of the immersion agent jet IMS, the automatic immersion module 3 is connected to a control device 12.

The method according to the invention is described in greater detail below for manual and automatic operation.

For manual operation, it is sufficient that a defined volume of immersion agent is sprayed upon the press of a button. This function can be initiated, by way of example, by a soft button on the surface of a touch display, which is not illustrated, used to control the microscope functions.

Figure 5:
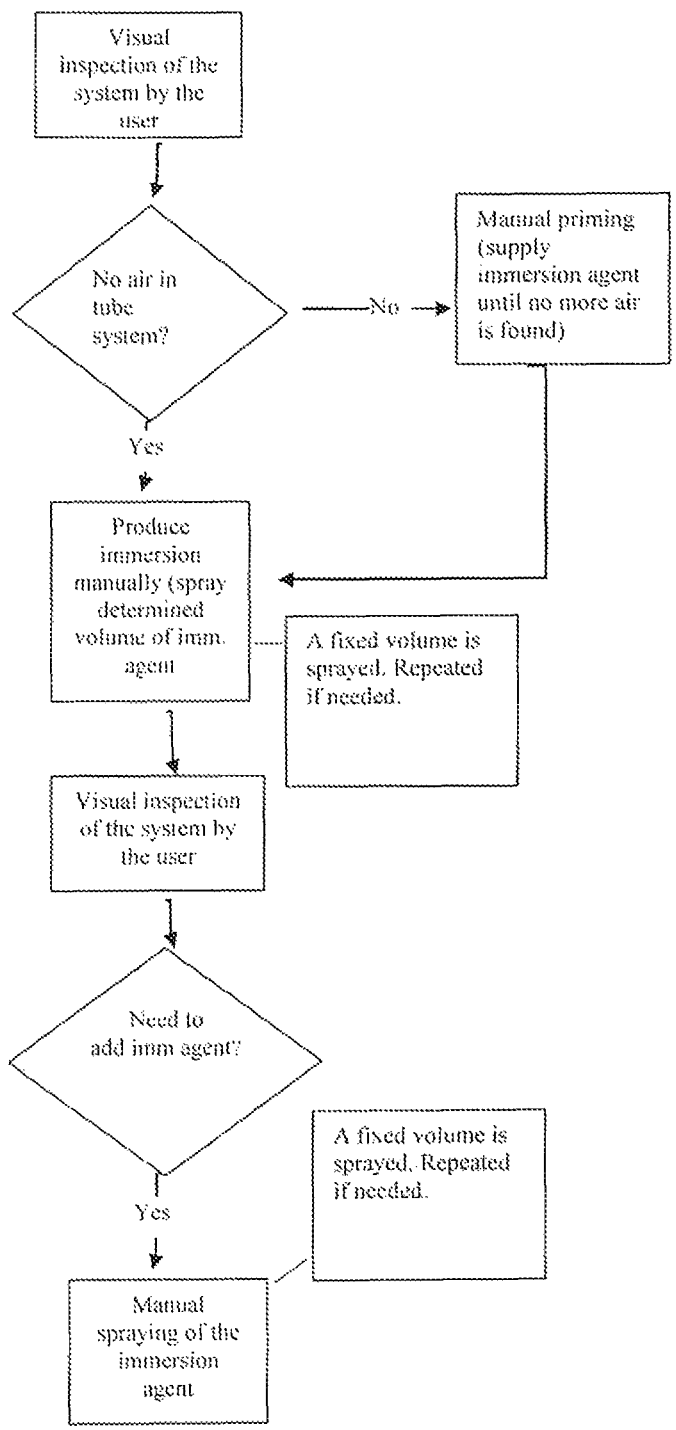
FIG. 5 depicts a flowchart of an exemplary process.

As an alternative, a manually actuated pump can also be used in principle. In manual operation, the user controls the results. An example of the process is depicted in FIG. 5.

If there are no sensors which monitor the actual state of the immersion agent column, only one controlled mode is available for automatic operation. The values for the volume of added immersion agent and the time interval between the immersion processes must then be determined empirically for different experimental scenarios. The values of the resulting characteristic map depend on, among other things, temperature, working state of the specific objective, the material pairings and the sum of the positioning stage movements.

This approach is unavoidably associated with an excess of immersion agent. In order to prevent the immersion agent from flowing off into the interior of the microscope stand, a protective device, such as an "Aqua Stop", should be used to divert and capture the excess volume of immersion agent.

As an alternative, foam collars edged over the objective, or foam mats inserted over the same are sufficient.

Automatic operation also additionally requires the presence of a control device, for example in the form of a microcontroller.

Figure 6:
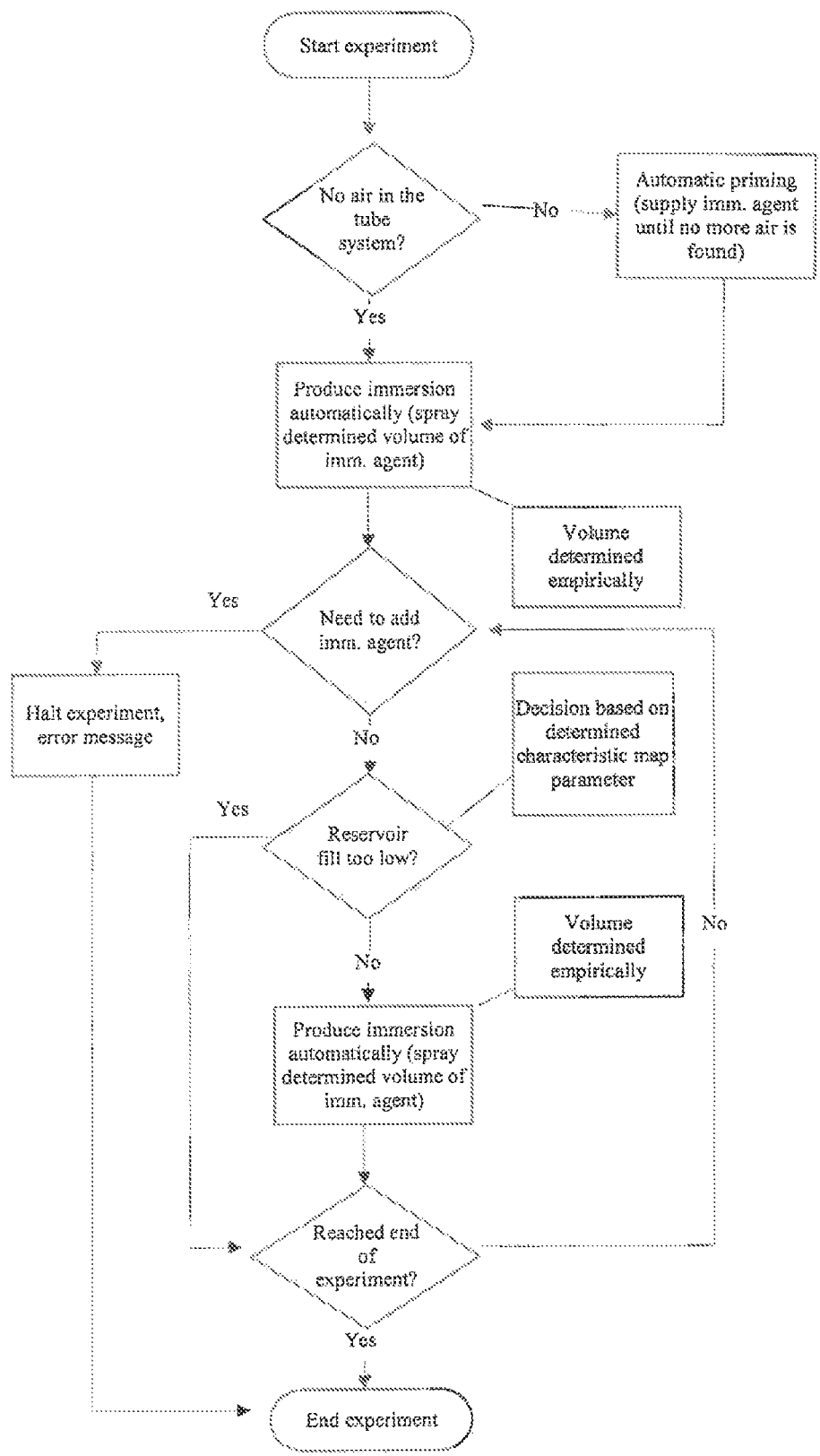
FIG. 6 depicts a flowchart of an exemplary automatic process.

Further assuming that a fill level monitoring is implemented for the immersion agent reservoir 8 of the medium, an exemplary automatic process is depicted in FIG. 6.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

The invention claimed is:

1. A device for forming an immersion agent film between a sample holder and an objective of a microscope, comprising an automatic immersion module for supplying immersion agent from an immersion agent reservoir to a target position on the sample holder or on a positioning stage, the device having a spraying device with a nozzle, whereby the spraying device is connected to a pump for generating a free immersion agent jet.

2. The device according to claim 1, wherein the spraying device is arranged so that the free immersion agent jet bypasses a beam path of the objective.

3. The device according to claim 1, comprising a sample holder, wherein the sample holder is arranged to enable axial movement perpendicular to the optical axis of the objective in an x/y direction, and an objective revolver is arranged to enable axial movement along the optical axis of the objective.

4. The device for forming an immersion agent film according to claim 1, wherein the pump and the nozzle are adjustable to vary the free immersion agent jet according to both dosing and speed of the immersion agent jet.

5. The device for forming an immersion agent film according to claim 4, further comprising an actuating element for manually initiating the immersion agent jet.

6. The device for forming an immersion agent film according to claim 4, wherein the automatic immersion module is connected to a control device.

7. The device for forming an immersion agent film according to claim 6, wherein the control device is a control computer.

8. A method for forming an immersion agent film between a sample holder and an objective of a microscope, wherein a dosed free immersion agent jet is sprayed onto a target position on the sample holder, or a position on a positioning stage, at a defined speed via an automatic immersion module, the automatic immersion module comprising a spraying device equipped with a pump and a nozzle.

9. The method for forming an immersion agent film according to claim 8, wherein the immersion agent jet is oriented so that the immersion agent jet bypasses a beam path of the objective.

10. The method for forming an immersion agent film according to claim 8, wherein immersing occurs at the focal position of the objective.

11. The method for forming an immersion agent film according to claim 8, wherein the immersion agent jet is sprayed onto the objective and the sample holder, and then the immersion agent moves into an immersion gap via capillary action.

12. The method for forming an immersion agent film according to claim 8, wherein an objective with a lower height, or an empty position of an objective revolver, is first pivoted into an optical axis of the objective, then a small dose of the immersion agent is applied to the sample holder.

13. The method for forming an immersion agent film according to claim 8, wherein the distance between the objective and the sample holder is enlarged, such that the immersion column is stretched and constricted and bubbles which are present are driven out of the immersion agent.

14. The method for forming an immersion agent film according to claim 8, wherein the sample is moved perpendicularly to an optical axis in the x/y direction until bubbles adhering to the sample holder leave an immersion column and burst.

15. The method for forming an immersion agent film according to claim 8, wherein an objective revolver is rotated by approximately 10° such that the immersion column is drawn out of the optical axis, to a point where bubbles on the sample holder leave the immersion column and burst.

16. A microscope including a device for forming an immersion agent film between a sample holder and an objective of the microscope, the device comprising an automatic immersion module for supplying immersion agent from an immersion agent reservoir to a target position on the sample holder or on a positioning stage, the device having a spraying device with a nozzle, whereby the spraying device is connected to a pump for generating a free immersion agent jet.

17. The microscope according to claim 16, comprising an objective revolver, wherein the spraying device is arranged along an axis of the objective revolver.

18. The microscope, according to claim 16, comprising a stand body, wherein the spraying device is attached to the stand body.

* * * * *